United States Patent
Knas et al.

(10) Patent No.: US 10,412,194 B1
(45) Date of Patent: Sep. 10, 2019

(54) SYSTEMS AND METHODS FOR MANAGING COMPUTER-BASED REQUESTS

(71) Applicant: MASSACHUSETTS MUTUAL LIFE INSURANCE COMPANY, Springfield, MA (US)

(72) Inventors: Michal Knas, Monson, MA (US); Jiby John, Suffield, CT (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 238 days.

(21) Appl. No.: 15/373,763

(22) Filed: Dec. 9, 2016

Related U.S. Application Data

(60) Provisional application No. 62/265,849, filed on Dec. 10, 2015.

(51) Int. Cl.
| | |
|---|---|
| *G06F 15/173* | (2006.01) |
| *H04L 29/08* | (2006.01) |
| *H04L 12/26* | (2006.01) |
| *H04L 29/06* | (2006.01) |

(52) U.S. Cl.
CPC .......... *H04L 67/327* (2013.01); *H04L 43/106* (2013.01); *H04L 67/42* (2013.01)

(58) Field of Classification Search
CPC ...... H04L 67/327; H04L 43/106; H04L 43/42
See application file for complete search history.

(56) References Cited

U.S. PATENT DOCUMENTS

| | | | | |
|---|---|---|---|---|
| 6,510,431 B1* | 1/2003 | Eichstaedt | ............. | H04L 29/06 |
| 6,744,761 B1* | 6/2004 | Neumann | ............. | G06Q 10/10 370/351 |
| 6,880,028 B2* | 4/2005 | Kurth | ............. | G06F 13/3625 710/240 |
| 7,047,366 B1* | 5/2006 | Ezra | ............. | G06F 12/0804 711/129 |
| 9,098,509 B1* | 8/2015 | Kapoor | ............. | G06F 17/30023 |
| 2002/0101979 A1* | 8/2002 | Borodow | ............. | H04L 29/06027 379/265.02 |
| 2008/0310398 A1* | 12/2008 | Jain | ............. | G10L 25/78 370/352 |
| 2010/0211935 A1* | 8/2010 | Weber | ............. | H04L 47/10 717/127 |
| 2013/0339077 A1* | 12/2013 | Maresh | ............. | G06Q 10/06 705/7.19 |

* cited by examiner

*Primary Examiner* — Tonia L Dollinger
*Assistant Examiner* — Dixon F Dabipi
(74) *Attorney, Agent, or Firm* — Eric L. Sophir; Dentons US LLP

(57) ABSTRACT

A system includes a client device and a server in communication to a database. The server receives a request for service from a client device via an electronic message. The server then generates instructions to receive a characteristic of the client device, and to query for a record to identify whether the characteristic has a predetermined time period for priority service. The server determines whether a timestamp of the request is within the predetermined time period for the priority service. The server then increments a counter value associated with request having the characteristic having the timestamp within the predetermined time period for the priority service. When the counter value satisfies a threshold value, the server automatically adjust a record of each request having the characteristic to indicate the priority service regardless of a basis for the request.

17 Claims, 3 Drawing Sheets

SYSTEMS AND METHODS FOR MANAGING COMPUTER-BASED REQUESTS

CROSS-REFERENCE TO RELATED APPLICATION

This application claims priority to U.S. Provisional Patent Application Ser. No. 62/265,849, filed on Dec. 10, 2015, which is hereby incorporated by reference in its entirety.

TECHNICAL FIELD

The present disclosure relates in general to computer-based service request management methods and systems.

BACKGROUND

Existing computer-based systems and methods do not adequately further the objectives of the clientele they serve. As an example, service organizations such as "call centers" are frequently used, either as part of a larger organization, or as a separate entity, to manage the provision of a range of possible services to customers or clients. A client or customer typically contacts the service organization to make a request for services, such as information technology-related services. A typical service organization receives numerous such requests, and therefore make some effort to prioritize the handling of these requests for services. For example, service request may be processed on a "first-in, first-out" (FIFO) basis. In other words, those requests for services that are placed earlier in time are given priority over those requests for services that occur later in time. Typical prioritization schemes may also allow for deviation from a default first in, first out scheme. Such prioritization may allow for escalating the priority of a request for services. However, these typical schemes for managing service requests do not involve consideration of business-process specific information associated with the customers, clients, or their organizations. Therefore, the manner in which such service requests are typically handled by the service organization do not necessarily further the business objectives of their customers, clients, or their organizations, in an optimal way.

SUMMARY

For the aforementioned reasons, there is a need for a method and a system to efficiently manage computer-based service request. The systems and methods disclosed herein attempt to address the above-mentioned shortcomings in the art and provide a variety of other benefits. The systems and methods described herein can manage and perform an optimal processing of the computer-based service requests.

In an embodiment a method comprises receiving, by a server, a request from a client device, wherein the request is received via an electronic message originated from the client device. The method comprises generating, by the server, a first instruction configured to receive a characteristic of the client device associated with the request. The method comprises upon transmitting the first instruction to a database, receiving, by the server, the characteristic of the client device. The method comprises determining, by the server, whether the request has a predetermined time period for priority service based on the characteristic of the client device within the database. The method comprises, upon the request having a predetermined time period for priority service, determining, by the server, whether a timestamp of the request is within the predetermined time period for the priority service. The method comprises upon determining that the timestamp of the request is within the predetermined time period for priority service, incrementing, by the server, a counter value associated with request having the timestamp within the predetermined time period for the priority service. The method comprises upon the counter value satisfying a threshold value, automatically adjusting, by the server, a record of the request having the characteristic of the client device to indicate a priority service regardless of a basis for the request.

In another embodiment, a computer system comprises a server, which is configured to receive a request from a client device, wherein the request is received via an electronic message originated from the client device. The server is configured to generate a first instruction configured to receive a characteristic of the client device associated with the request. The server is configured to, upon transmitting the first instruction to a database, receive the characteristic of the client device. The server is configured to determine whether the request has a predetermined time period for priority service based on the characteristic of the client device within the database. The server is configured to upon the request having a predetermined time period for priority service, determine whether a timestamp of the request is within the predetermined time period for the priority service. The server is configured to, upon determining that the timestamp of the request is within the predetermined time period for priority service, increment a counter value associated with request having the timestamp within the predetermined time period for the priority service. The server is configured to, upon the counter value satisfying a threshold value, automatically adjust a record of the request having the characteristic of the client device to indicate a priority service regardless of a basis for the request.

In another embodiment, a method comprises receiving, by a server, a phone call from a client device comprising a request. The method comprises determining, by the server, a characteristic of the client device associated with the request, wherein the characteristic of the client device is associated with a phone number associated with the client device. The method comprises generating, by the server, a first instruction configured to query for a record to identify whether the characteristic has a predetermined time period for priority service. The method comprises upon transmitting the first instruction to a database, determining whether the characteristic has a predetermined time period for priority service. The method comprises upon the characteristic having a predetermined time period for priority service, determining, by the server, whether a timestamp of the request is within the predetermined time period for priority service. The method comprises upon determining that the timestamp of the request is within the predetermined time period for priority service, routing, by the server, the phone call to an agent.

Numerous other aspects, features and benefits of the present disclosure may be made apparent from the following detailed description taken together with the drawing figures.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DETAILED DESCRIPTION

Figure 1A:
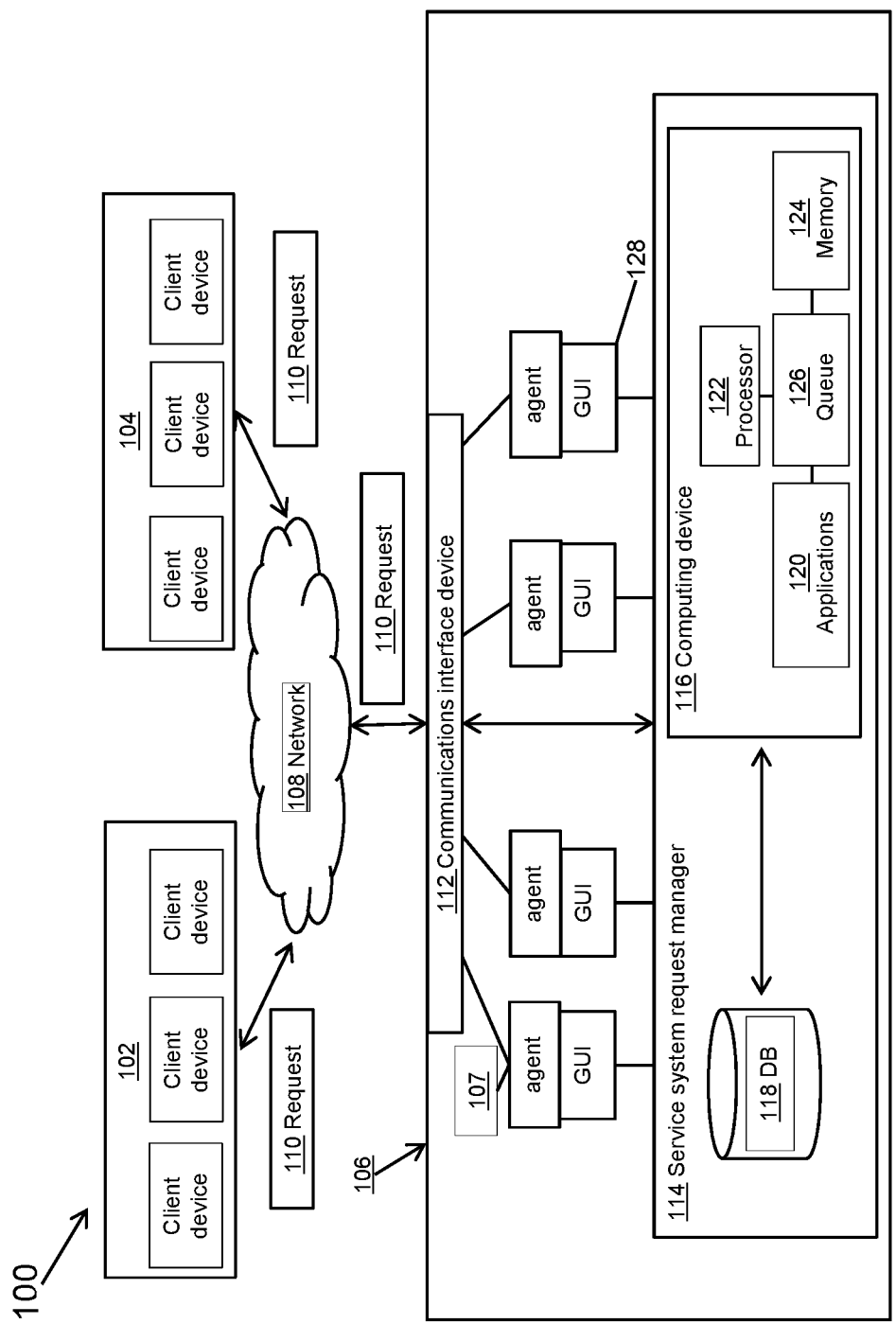
FIG. 1A illustrates a computer-based service request management system, according to an exemplary embodiment.

The present disclosure is here described in detail with reference to embodiments illustrated in the drawings, which form a part thereof. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the disclosure is thereby intended. Alterations and further modifications of the inventive features illustrated here, and additional applications of the principles of the disclosures as illustrated here, which would occur to one skilled in the relevant art and having possession of this disclosure, are to be considered within the scope of the disclosure.

FIG. 1A illustrates a computer-based service request management system 100. The computer-based service request management system 100 may include a plurality of client devices such as computing devices belonging to one or more client systems 102, 104. The computer-based service request management system 100 may further include a service organization system (or service system) 106 comprising various hardware and software elements specifically constructed and arranged to carry out the objectives of the service system 106, as it relates to the goals and objectives of their clients. The client systems 102, 104 are connected with the service system 106 via at least one network 108. The network 108 can constitute one or more networks, as necessary to facilitate communications between the clients and the service organization 106. The network 106 may constitute one or more of a: computer network, landline based telephone network, or a mobile phone network. Non-limiting examples of such networks 106 include the Internet, intranets, extranets, wide area networks (WANs), local area networks (LANs), virtual private networks (VPNs) wired networks, wireless networks, or other suitable networks, and/or combinations thereof.

In some embodiments, client system 102 may represent a first corporation and client system 104 may represent a second corporation. The client systems 102, 104 may represent separate departments or divisions within the same corporation or business-related organization. Thus, by way of non-limiting example, client system 102 may represent system of a sales department and client system 104 may represent system of an accounting department, both part of the same company (or other companies). According to further alternative embodiments, the plurality of clients may be unrelated to one another and are not part of the same overall organization or department/division, but are rather unrelated separate individuals.

In some embodiments, the service system 106 may form part of the same organization to which the clients belong. In other words, service system 106 can be of an "in-house" service organization. Alternatively, the service system 106 may form no part of the organization to which any of the clients may belong. The service system 106 may be structured to provide any number of possible services according to the principles of the present disclosure. Thus, service system 106 may be constituted such that it provides, by way of nonlimiting example: information-technology-related services (IT), household services (HVAC, plumbing, electrical, yard work, etc.), technical support for purchased goods, or utilities-related services. A number of agents 107 can also be associated with the service system 106.

The client devices may submit one or more service requests 110 to the service system 106 via the network 208. The service request 110 can be in any suitable form. Thus, by way of non-limiting example, the service request 110 may be in the form of a voice communication (e.g., mobile phone call landline-based call, voice over Internet protocol (VoIP) call), video communication, or written electronic message (e.g., email communication, SMS message, text message, etc.). In some embodiments, certain information is associated with the service requests 110 which may include one or more of: the personal identity of the user of the client device, the company or business organization with which the client device is associated, the particular division or unit of the company or business organization with which the client device is associated, the client device user's assessment of the level of importance of the service request ring submitted, at least one piece of client organization-specific business process data. The business process data may include information such as key deadlines or times associated with the client's organization and/or key business objectives associated with the client's organization. For example, an accounting department of the corporation may have a policy or requirement of entering certain information into the accounting system by the close of business each day. Thus, a service request 110 received from a user of a client device who belongs to such an accounting department would have such information associated with it such that this information could be taken in consideration in managing how the service request 110 is handled. By way of non-limiting example, if 5:00 PM is considered close of business, and a client from such an accounting department submits a service request 110 at 4:30 PM, this information can be utilized such that the service request 110 receives the appropriate level of prioritization by the service system 106.

The information may be associated with the service request 110 by any suitable technique. For example, the identity of the user of the client device can be ascertained from "caller ID" or a similar mechanism. The user of the client device is then looked up in a database and certain information associated with the user of the client device is matched to the service request 110. By way of non-limiting example, the identity of the user of the client device can be ascertained through the use of caller ID. The user of the client device is then looked up in the database where it is determined that the particular user of the client device is an employee of the accounting department of a company. This information, along with any particular user of the client device specific business process information is then associated with the service request 110 for further processing. Alternatively, the user of the client device can be queried, either by one of the agents associated with the service system 106, or in an automated fashion through responses provided to an automated menu of questions.

In some embodiments, the service requests 110 are received by the service system 106 by way of a communications interface device 112. The communications interface device 112 may be physically located outside of the service system 106. In an alternate embodiment, the communications interface device 112 may be internally located relative to the service system 106. In yet another embodiment, the communications interface device 112 may be disposed within, or combined with, other components of the service system 106, rather than being a standalone device. By way of non-limiting example, the communications interface device 112 could be integrated with a service system request manager 114, or other component of the service system 106.

The communications interface device 112 may be provided in any suitable form that allows communications with the network 108 including the types of networks described above. Thus, the communications interface device 112 can constitute a single device, or a plurality of separate devices. For example, the communications interface device 112 can constitute both a computer network interface as well as a cellular and/or landline-based telephone interface, either as separate devices, or an integrated device possessing dual functionality. Specific illustrative and non-limiting examples include a Private Branch Exchange (PBX) type switch. Further, it should be noted that the communications interface device 112 also enables and/or facilitates outbound communications originating from within the service system 106 to its clients, or others.

The service system 106 further comprises a service request manager 114. According to certain non-limiting examples, the service system request manager 114 can comprise a collection of appropriate hardware and software components for exercising the core logic and functionality associated with the service system request manager 114, and the service system 106 as a whole. For example, the service system request manager 114 can comprise one or more computing devices 116, and one or more collections of data or databases 118. Each computing device 116 may comprise, for example, a server computer or any other system providing computing capability. Alternatively, a plurality of computing devices 116 may be employed that are arranged, for example, in one or more banks or other arrangements. For example, a plurality of computing devices 116 together may comprise a cloud computing resource, a grid computing resource, and/or any other distributed computing arrangement. Such computing devices 116 may be located in a single installation or may be dispersed among many different geographical locations. In some embodiments, each computing device 116 may represent a virtual computer system executing on one or more physical computer systems. Although each computing device 116 is referred to herein in the singular, it should be understood that a plurality of computing devices 116 may be employed.

The one or more databases 118 of the service system request manager 114 may include, for example, rules, code, logic, service level agreements, client identity data, client organization business process specific data, etc. Furthermore, various applications 120 and/or other functionality may be executed by a processor 122 in each computing device 116. Also, various data can be stored in the database 118 that is in communication with the computing device 116. In this regard, a suitable mechanism, such as a database engine can be provided to access the data contained in the database 118. A suitable database engine, or similar component, can reside, for example, as an application 120 on the computing device 116, or within the database 118 itself. Alternatively, or in addition thereto, the computing device 116 may include a suitable memory 124 as an integral part thereof. The database 118 may be representative of a plurality databases 118. The data stored in the database 118 may be associated with the operation of the various applications and/or functionality described below.

The one or more databases 118 and the memory 124 may be a non-transitory computer-readable or processor-readable media that includes both computer storage media and tangible storage media that facilitate transfer of a computer program from one place to another. The non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a processor 122. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The components executed on each computing device 116, for example, may include a queue 126, which comprises data representing a ranking of request records to be handled in a priority order. The queue 126 can dynamically rank or order requests 110 as they arrive at the computing device 116 for processing by the applications 120. The queue 126 may comprise any first-in-first-out (FIFO) data structure or a service implementing ordering of the requests 110. In one embodiment, any of the requests 110 in the queue 126 may be accessible by way of random access. The queue 126 may support reordering or resequencing of the requests 110 as needed, based upon corresponding priorities associated with, or assigned to, the requests 110.

The computing device 116 may run one or more applications 120 to process the requests 110. By way of non-limiting example, the processing may include authenticating the user of the client device or otherwise verifying the identity of the user of the client device that originated the request 110, and/or performing the business logic that is core to the service system 106. The business logic includes processing information associated with the request 110, of the type previously identified herein, which includes at least one piece of client organization business process data of the type discussed above, and prioritizing the requests 110 based the application of this logic. The processing may involve data communication with various other computing systems.

A response may be produced by the service system request manager 114 in responding to the request 110. The response may be produced by any suitable mechanism, including the execution of the application 120 by the processor 122 of the computing device 116. The response may include, for example, a communication intended for the user of the client device, or other member of the client's organization. By way of non-limiting example, in the event that the request 110 is prioritized or escalated as a result of the analysis of information associated with the request 110, the service system request manager 114 can generate a message notifying a supervisor or manager associated with the client's organization so that a person of authority in the client's organization is made aware of a potentially serious issue.

The message may further include an indication of the steps being taken to address the particular issue that spawned the service request 110.

Figure 1B:
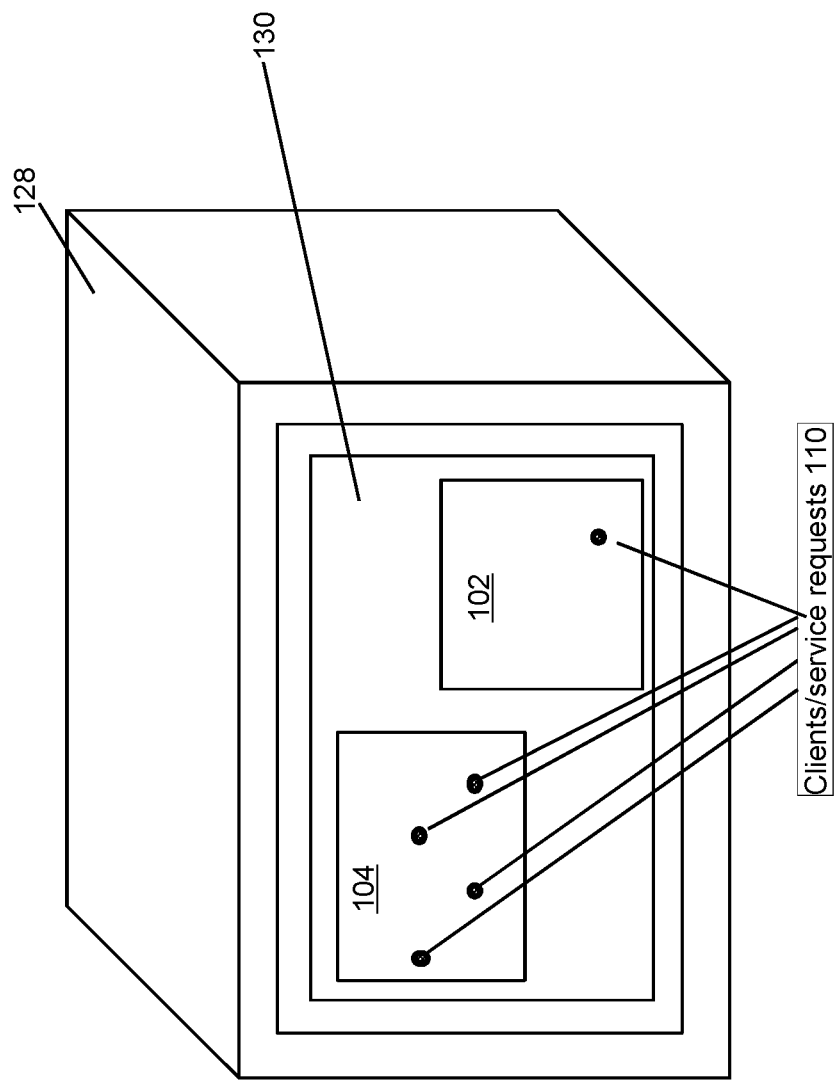
FIG. 1B illustrates a graphical user interface (GUI) of a computer-based service request management system, according to an exemplary embodiment.

In some embodiments, the service system request manager 114 may be provided with a capability of rendering a visual depiction 130 of the information associated with the one or more requests 110 on a graphical user interface (GUI) 128 as illustrated in FIG. 1B. In some embodiments, the service system request manager 114 may include graphics generation functionality that may use templates or the like to format data and information from the database 118 or other sources related to the various requests 110, handling status of the requests 110, resources assigned to the request 110, tasks associated with the requests 110, etc. By way of non-limiting example, the application 110 may receive information associated with the requests 110, with the assistance of the processor 122 obtained from the database 118, and then generate a graphic dashboard and/or report 128 that embodies that information. The application 120 may use stored templates or manually created templates to generate the graphic, dashboard or report which may be viewed by an agent.

According to one non-limiting example, the above described system components and functionality may be used to map certain information associated with the request 110. As previously discussed, information associated with the request 110 may include information about the location/department from which the request 110 originates. The location information may be processed by the application 110 and used to create the graphical map 130 as a visual aid to identify the location of the requests 110 coming into the service system 106. As shown in FIG. 1B, the graphic 130 presents a visual depiction of the location from which service calls are being placed into the service system. More specifically, according to this non-limiting example, an agent associated with the service system 106 is able to visualize that there is a cluster of four service calls emanating from the accounting department from a given floor of the client's device 104 organization, and one service call emanating from the sales department on the same floor of the client device 102 organization. This visual information makes it readily apparent that there are currently a concentration of service calls being received from the accounting department, which may require special attention from the service system 106.

Figure 2:
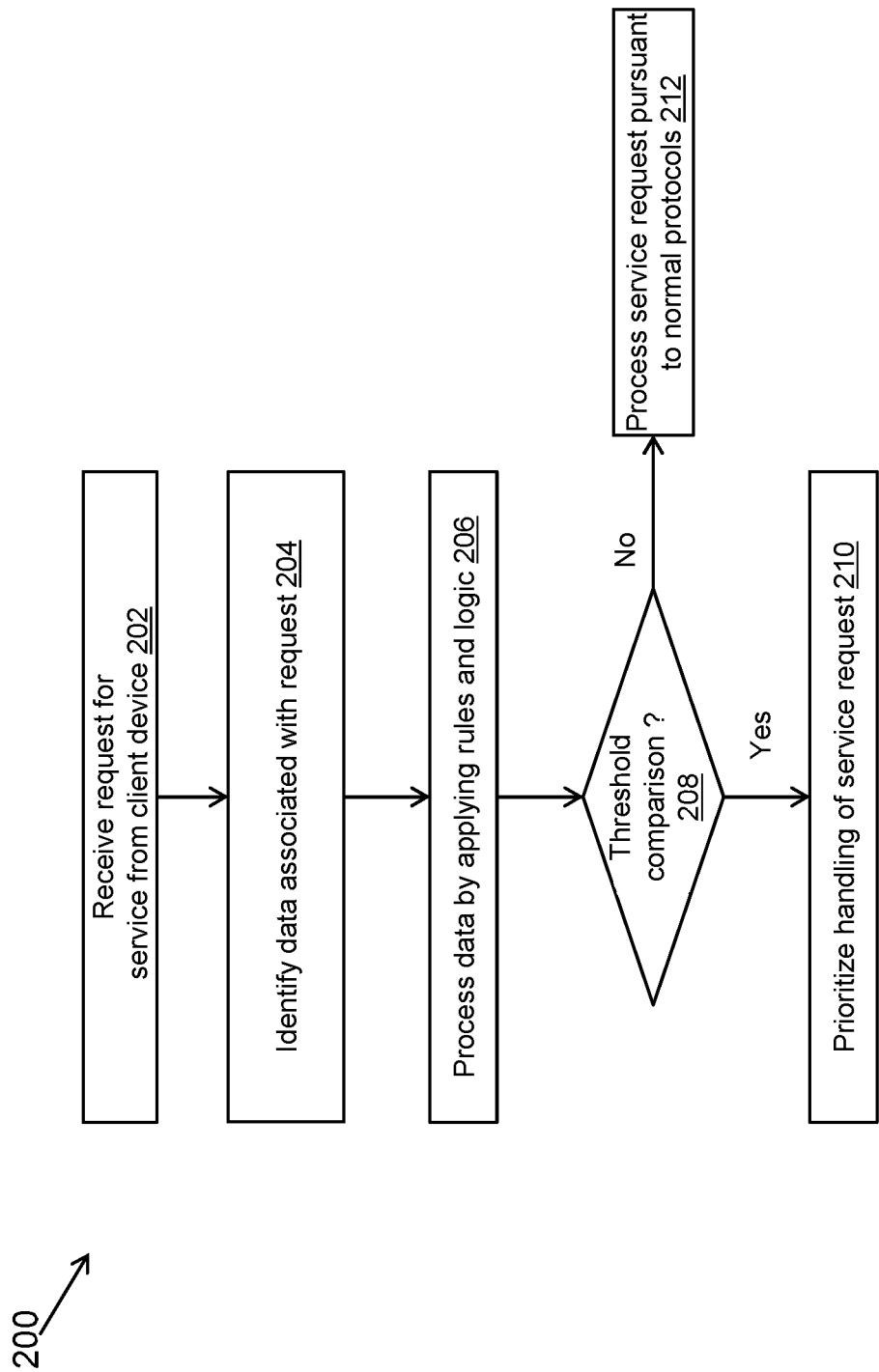
FIG. 2 is a flow diagram of an illustrative process for managing computer-based service requests, according to an exemplary embodiment.

FIG. 2 is a flow diagram of an illustrative process 200 for managing computer-based service requests, according to an exemplary embodiment. At step 202, a request for service is received from a client device. In an embodiment, the request may be presented in any suitable form. For example, the request may be in the form of a voice communication (e.g., mobile phone call, landline-based call, voice over Internet protocol (VoW) call), video communication, or written electronic message (e.g., email communication, SMS message, text message, etc.). In some embodiments, a server may receive the request from the client device. The server may generate a request dataset, which may include one or more data record indicating information/data associated with the request. For example, the request dataset may include data associated with the client device, the time of receipt of the request, and the like.

At step 204, the process includes identifying data that may be associated with the request. The data may be or read/interpreted in an automated manner. For example, the server may generate an instruction configured to query/identify data associated with the user associated with the client device. The server may then transmit the instruction to a database, and upon this transmission, the server may receive the identification data. The data may include, but not necessarily limited to, the personal identity of the user/client, the company or business organization with which the user is affiliated, the particular division or unit of the company or business organization with which the user is associated, the user's assessment of the level of importance of the request being submitted, and at least one piece of user organization-specific business process data. The business process data may be in the form of, for example, key deadlines or times associated with the user's organization and/or key business objectives associated with the user's organization. For example, an accounting department of the corporation may have a policy or requirement of entering certain data into the accounting system by close of business each day. Thus, a request for the service, or service request dataset, may include data that identifies the user as being associated with the accounting department.

The identified data associated with the request may be taken into consideration in subsequent steps of the process. For example, the server may update the request data set with new data. In an embodiment, if 5:00 PM is considered close of business (e.g., the server has been instructed or has a pre-determined threshold of 5:00 PM as the end value of the business day), and a user from the accounting department submits a request at 4:30 PM (e.g., the server receives the request at 4:30), this data can be utilized such that the request receives the appropriate level of prioritization by the service system. For example, the server, may first generate a request dataset for the received request and update the dataset such as updating the record with relevant data such as indicators of the client device, time received. The server may also determine a time stamp associated with the received request and also determine whether the time stamp is within a time period for priority service. The time period for priority service may be pre-defined for the server or the received from a client device. In some embodiments, the time period may be associated with the request. For example, certain requests may have an urgency, which requires a shorter response time period. The server may then generate an instruction to query a database in order to obtain a time period associated with the request and transmit aid instruction in order to receive this information. Another example, of the data queried by the server may include characteristics of the client device. For example, the server may query, for example, generate an instruction configured to receive and transmit it to the database, and receive data indicating that the client device is associated with the accounting department. The server may then update a characteristic value within the request dataset to reflect this information.

Once the data associated with the request has been identified at step 204, the data associated with the request for services is then processed at step 206, by analyzing the data and applying rules and logic to the data, which directs subsequent steps in the processing of the request. This processing of the identified data may be performed, for example, through the execution of computer instructions, code, rules and/or logic. Thus, by way of nonlimiting example, one or more applications can be executed through computer hardware components to perform the processing of the data that contains at least one piece of client-specific business process data, for example, characteristic associated with the client device. In some embodiments, the server may generate an instruction to receive a characteristic of the client device associated with the service request from a database, and upon transmitting the instruction to the database, the server may receive the characteristic of the client device associated with the service request.

At step 208, the server may determine whether or not a particular predetermined threshold has been met by the characteristic of the client device. For example, the server may generate an instruction configured to query for a record to identify whether the characteristic has predetermined time period for priority service. In some embodiments, the particular predetermined threshold criteria can take any suitable form. Thus, by way of non-limiting example, if the request includes data that the client works in the accounting department, and the accounting department has a deadline every day at close of business, or 5:00 PM, this data may be taken into consideration. If a service request is received at 4:30 PM by a client that belongs to the accounting department, a predetermined threshold may be exceeded which could trigger escalation of the handling of the service request, at step 210. This determination is made by storing a record of a department having a need for priority service within a predetermined time period and then determining whether a timestamp of the service request is within that time period. In other words, the server may determine whether a timestamp of the service request is within the predetermined time period for the priority service, and upon determining that the timestamp of the service request is within the predetermined time period for priority service, the server may increment a counter value associated with service request. having the characteristic having the timestamp within the predetermined time period, to escalate handling of the request.

The server upon determining that the counter value satisfies a threshold value, the server may automatically adjust a record of each service request having the characteristic to indicate the priority service regardless of a basis for the service request. In other words, once the number of service requests satisfies a threshold amount, those service requests for that department or any other characteristic of the service request needing priority service can be moved to a higher priority in the queue. In some embodiments, a supervisor device may be provided that may receive an alert, and the data records of these service requests will reflect that they are now a high priority. The threshold may be satisfied (e.g., exceeded or triggered) based at least in part on the number of service requests received from a particular organization or division thereof.

In some embodiments, the escalation or prioritization of the handling of the service request triggered by exceeding a particular threshold value can take any suitable form. By way of non-limiting example, the processing of the service request could be accelerated by: advanced placement of the request in a service request queue; assigning certain personnel associated with the service organization to handle the service request; assigning multiple personnel associated with the service organization to handle the service request, generating and transmitting a message notifying a manager or supervisor of the service organization of the existence of escalated processing of the service request, and/or generation and transmitting a message notifying a supervisor or manager associated with the client's organization of the existence of the escalated service request.

Alternatively, if it is determined that the predetermined threshold is not met at step 208, the service request may be processed according to normal protocols at step 212. By way of non-limiting example, the processing of the service request according to normal protocols may involve simply placing the service request in a queue, for example, at a position corresponding to a "first-in, first-out" protocol.

In some embodiments, a request for service is received from a client device. In an embodiment, the request may be presented in any suitable form. For example, the request may be in the form of a mobile phone calls, a digital notification for phone call, or a VOW call. The server may generate a request dataset, which may include one or more data record indicating information/data associated with the request. For example, the request dataset may include data associated with the client device, the time of receipt of the request, and the like. The server may then determine a characteristic of the client device associated with the service request where the characteristic of the client device is associated with the phone number associated with the client device. The server may generate an instruction configured to query for a record to identify whether the characteristic has predetermined time period for priority service. Upon transmitting the instruction to a database and in response to the characteristic having a predetermined time period for priority service. The server may determine whether a timestamp of the service request is within the predetermined time period for priority service. Upon determining that the timestamp of the service request is within the predetermined time period for priority service, the server may route the phone call to an agent. In some embodiments, if there is no agent presently available for the server to reroute the call to another agent or the server may place the received call on hold and create a queue for all the calls on hold and move up the received phone call to the top of the queue. A person skilled in the relevant art will appreciate that the server may simultaneously receive multiple calls from multiple client devices and upon one of the calls satisfying the above-mentioned criteria, the server may treat one call with priority.

Consistent with the above, the method includes identifying the information associated with the request, including the aforementioned at least one piece of client-specific business process data. The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here. None of the features recited herein should be interpreted as invoking 35 U.S.C. § 112(f), unless the term "means" is explicitly used.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed is:

1. A method comprising:
   receiving, by a server, a request from a client device operating within an organization, wherein the request is received via an electronic message originated from the client device;
   generating, by the server, a first instruction configured to receive a characteristic of the client device associated with the request;
   upon transmitting the first instruction to a database, receiving, by the server, the characteristic of the client device, wherein the characteristic of the client device comprises location information of the client device, and wherein the location information corresponds to a department within the organization;
   determining, by the server, whether the request has a predetermined time period for a priority service based on the characteristic of the client device within the database;
   upon the request having the predetermined time period for the priority service, determining, by the server, whether a timestamp of the request is within the predetermined time period for the priority service;
   upon determining that the timestamp of the request is within the predetermined time period for priority service, incrementing, by the server, a counter value associated with the request having the timestamp within the predetermined time period for the priority service;
   upon the counter value satisfying a threshold value, automatically adjusting, by the server, a record of the request having the characteristic of the client device to indicate the priority service regardless of a basis for the request; and
   presenting, by the server, a graphic dashboard on an agent computer comprising the record and a graphical map displaying the location information of the client device, wherein the graphic dashboard is generated using a template selected based on tasks associated with the record and handling status of the record.

2. The method of claim 1, wherein the characteristic of the client device comprises an identity of a user of the client device.

3. The method of claim 1, further comprising rendering, by the server, a visual depiction of the one or more request records displayed on a graphical user interface.

4. The method of claim 1, further comprising generating and displaying, by the server, an alert message upon adjusting the record of the request having the characteristic.

5. The method of claim 4, further comprising transmitting, by the server, the alert message to a supervisor device.

6. The method of claim 1, wherein automatically adjusting the record of the request comprises dynamically associating an agent to the record of the request.

7. The method of claim 1, wherein automatically adjusting the record of the request comprises dynamically adjusting a queue of records of requests to increase a ranking of the records of the request having the characteristic of the client device.

8. A system comprising:
a server configured to:
receive a request from a client device operating within an organization, wherein the request is received via an electronic message originated from the client device;
generate a first instruction configured to receive a characteristic of the client device associated with the request;
upon transmitting the first instruction to a database, receive the characteristic of the client device, wherein the characteristic of the client device comprises location information of the client device, and wherein the location information corresponds to a department within the organization;
determine whether the request has a predetermined time period for a priority service based on the characteristic of the client device within the database;
upon the request having the predetermined time period for the priority service, determine whether a timestamp of the request is within the predetermined time period for the priority service;
upon determining that the timestamp of the request is within the predetermined time period for the priority service, increment a counter value associated with the request having the timestamp within the predetermined time period for the priority service;
upon the counter value satisfying a threshold value, automatically adjust a record of the request having the characteristic of the client device to indicate the priority service regardless of a basis for the request; and
present a graphic dashboard on an agent computer comprising the record and a graphical map displaying the location information of the client device, wherein the graphic dashboard is generated using a template selected based on tasks associated with the record and handling status of the record.

9. The system of claim 8, wherein the characteristic of the client device comprises an identity of an user of the client device.

10. The system of claim 8, wherein the server is further configured to generate an alert message upon adjusting the record of the request.

11. The system of claim 10, wherein the server is further configured to transmit the alert message to a supervisor device.

12. The system of claim 8, wherein automatic adjustment of the record of the request having the characteristic comprises dynamically associating an agent to the record of the request having the characteristic.

13. The system of claim 8, wherein automatically adjusting the record of the request comprises dynamically associating an agent to the record of the request.

14. A method comprising:
receiving, by a server, a phone call from a client device operating within an organization comprising a request;
determining, by the server, a characteristic of the client device associated with the request, wherein the characteristic of the client device is associated with a phone number and location information of the client device, and wherein the location information corresponds to a department within the organization;
generating, by the server, a first instruction configured to query for a record to identify whether the characteristic has a predetermined time period for a priority service;
upon transmitting the first instruction to a database, determining whether the characteristic has the predetermined time period for the priority service;
upon the characteristic having the predetermined time period for the priority service, determining, by the server, whether a timestamp of the request is within the predetermined time period for the priority service;
upon determining that the timestamp of the request is within the predetermined time period for the priority service, adjusting, by the server, a record of the request having the characteristic of the client device to indicate the priority service regardless of a basis for the request; and
routing, by the server, the phone call to an agent and presenting a graphic dashboard on an agent computer comprising the record and a graphical map displaying the location information of the client device, wherein the graphic dashboard is generated using a template selected based on tasks associated with the record and handling status of the record.

15. The method of claim 14, wherein the characteristic of the client device comprises an identity of an user of the client device.

16. The method of claim 14, wherein the server and the database are connected via a communications network.

17. The method of claim 14, further comprising generating, by the server, an alert message upon determining that the timestamp of the request is within the predetermined time period for the priority service, and transmitting the alert message to a supervisor device comprising data representing record of each prioritized service.

* * * * *